No. 746,504. Patented December 8, 1903.

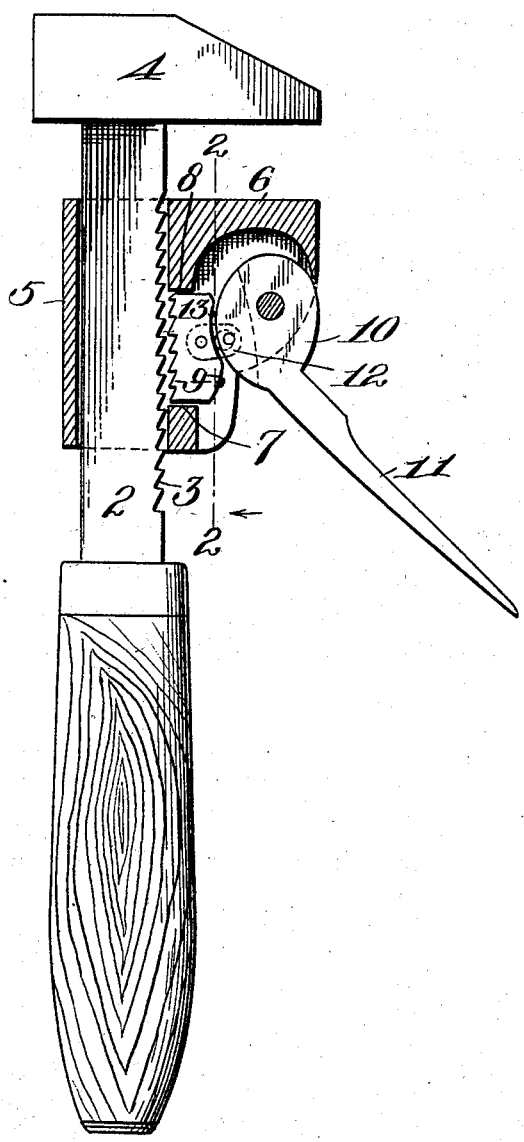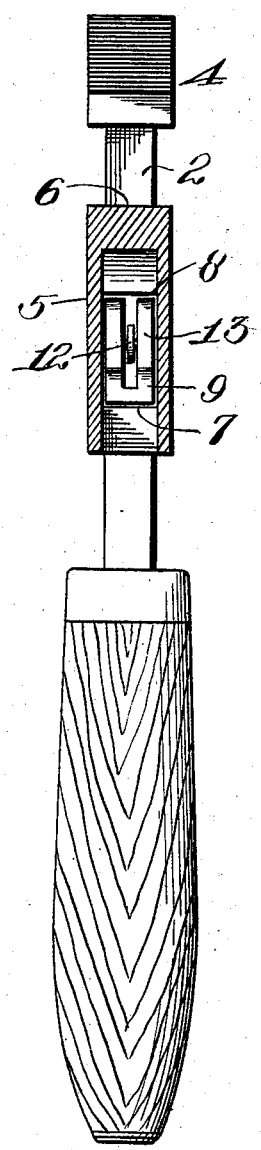

UNITED STATES PATENT OFFICE.

JOHN A. HARDY AND EDWARD L. GOODYKOONTZ, OF IAEGER, WEST VIRGINIA.

WRENCH.

SPECIFICATION forming part of Letters Patent No. 746,504, dated December 8, 1903.

Application filed March 21, 1903. Serial No. 148,934. (No model.)

*To all whom it may concern:*

Be it known that we, JOHN A. HARDY and EDWARD L. GOODYKOONTZ, citizens of the United States, residing at Iaeger, in the county of McDowell and State of West Virginia, have invented new and useful Improvements in Wrenches, of which the following is a specification.

This invention relates to what we shall for convenience term a "wrench," for the reason that the improvements are susceptible of advantageous use in connection with analogous implements.

The improved device is simple in construction, can be inexpensively made, and is adapted to obtain and retain a firm hold upon an object, which may be either a nut, pipe, or the like.

The improved wrench includes a toothed shank provided with a jaw, a slide upon the shank provided with a jaw coöperative with the other jaw, and a toothed locking-dog carried by the slide, the teeth of which are adapted to engage those on the shank, and the upper end of the dog having a straight face at approximately right angles to the shank, and the slide having interiorly a similarly-disposed face adapted to engage the other face when the dog is in its effective position, whereby the said dog by virtue of the engagement between said two faces acts as a solid abutment to resist the retractive or opening movement of the jaw carried by the slide. In practice means are provided for actuating the dog and for also locking it in its effective position. Preferably both ends of the dog are provided with such right-angular faces, the slide being likewise formed, and the dog moves toward and from its working position between and in contact with the straight faces upon the slide, whereby said dog is accurately guided during its motion, this being of particular importance as it is advanced toward the toothed edge of the shank. The means for operating the locking-dog is a cam-lever, the cam of which serves to move the locking-dog into its effective position and the lever being connected operatively with the dog in order to remove the latter from such effective position, which connection may consist of a link.

The invention is shown in one simple and convenient embodiment thereof in the accompanying drawings, forming a part of this specification, and in which—

Figure 1 is a longitudinal central sectional elevation of a wrench embodying our invention. Fig. 2 is a sectional elevation taken in the line 2 2 of Fig. 1.

Like characters of reference refer to like parts in both views.

We have shown the invention incorporated in a device familiarly known as a "monkey-wrench;" but, as previously indicated, the invention is not limited in this respect. The wrench illustrated includes a shank 2, toothed or serrated at 3 upon its inner side and terminating at its outer end in a jaw 4. The said shank is provided with a slide 5, shown as a stirrup straddling the shank 2 and having between the cheeks thereof upon the toothed side of the shank 2 the integral jaw 6, which jaw, as will be obvious, is slidable relatively to the other one and is adapted to coöperate therewith in order to grip an object. The sides or cheeks of the slide 5 are united near their lower side by the interior cross-piece or shoulder 7, the inner face of which is arranged close to the teeth or serrations 3. A shoulder 8 depends from the inner under side of the jaw 6 and is in alinement with said other shoulder longitudinally of the shank 2. The peculiar utility of these two shoulders will be hereinafter set forth. At this time it should be stated, however, that their adjacent faces are at right angles, or substantially so, to the shank 2.

Within the slide 5 is a locking-dog 9 for said slide, and hence for the jaw 6, forming a part of the same. The inner face of the locking-dog 9 is toothed or serrated, the teeth being adapted to engage those of the shank to lock the slidable jaw against backward or retractive motion. The end faces of this locking-dog, it will be seen, are straight and at right angles with the shank, they being adapted to coöperate with the similarly-disposed faces upon the two shoulders 7 and 8.

The cam-head 10 of a hand-lever 11 is pivoted between the sides or cheeks of the slide 5 and is connected by a link 12 with the locking-dog 9, the ends of the link being pivoted to the respective parts. The hole or perforation in the link 12 through which the outer pivot extends is of greater diameter than that of the corresponding pivot, whereby the hand-lever may have a limited amount of lost motion relatively to the locking-dog before moving the same out of engagement or working relation with the shank 2. The effective face of the cam is adapted to engage in a concavity 13 in the outer face of the locking-dog 9. By swinging the hand-lever 11 inward the working face of the cam will ride against the adjacent face of the concavity, and thereby force the locking-dog inward, with the teeth thereof in firm engagement with those on the shank, so as to lock the slide, and consequently the jaw carried thereby, in the desired position. Upon the opposite or outward motion of the hand-lever the locking-dog through the agency of the intermediate link is moved outward, so as to carry the teeth of the same out of engagement with the coöperating teeth upon the shank to release the slide, and hence the jaw 5 thereon, whereby said slide can be moved longitudinally of the shank in order to free an object between the jaws or to adjust the same for a small object.

The straight adjacent faces of the shoulders 7 and 8 constitute guides for directing the locking-dog squarely toward the shank 2, the opposite straight faces of the said dog during its inward and outward motion riding against the other faces. Not only do these several coöperating straight faces act to secure the desired object, but the upper ones perform an additional function. When the locking-dog 9 is in engagement with the shank 2, the lower straight face of the upper shoulder 8, it will be seen, abuts against the adjacent upper straight face of the locking-dog, which faces, as will be understood, are approximately at right angles to the shank, whereby the dog when in its effective position serves to receive the strain applied by an object to the slide 5 in order to solidly resist the backward motion of said slide. In addition to the advantages pointed out there is no strain applied to the pivot of the actuating and locking lever 11, which is an important consideration.

The different parts may be made of any relative sizes and of the materials usually employed in constructing this class of devices.

Having thus described our invention, what we claim as new, and desire to secure by Letters Patent, is—

A wrench including a toothed shank provided with a jaw, a slide upon the shank provided with a jaw coöperative with the other jaw, a toothed locking-dog carried by the slide, the teeth of which are adapted to engage those of the shank, the opposite ends of the dog having straight faces at approximately right angles to the shank, and the slide having interiorly similar straight faces between which the dog is disposed, a cam-lever, the cam portion of which is adapted to engage the locking-dog to thereby move the same into its effective position, and a link connected respectively with the locking-dog and the cam-lever.

In testimony whereof we have hereunto set our hands in presence of two subscribing witnesses.

JOHN A. HARDY.
EDWARD L. GOODYKOONTZ.

Witnesses:
FRED. W. EASLEY,
ROBT. H. MILLER.